United States Patent
Rodgers et al.

(10) Patent No.: US 8,448,382 B2
(45) Date of Patent: May 28, 2013

(54) APPARATUS FOR TRANSFERRING ELECTRIC POWER BETWEEN A CLOSABLE MEMBER AND A FRAME

(75) Inventors: Paul Justus Rodgers, Reno, NV (US); Thomas Edward Roth, Reno, NV (US); Larry Gene Corwin, Jr., Fernley, NV (US); Michael A. Webb, Cave Creek, AZ (US)

(73) Assignee: Securitron Magnalock Corporation, Phoenix, AZ (US)

( * ) Notice: Subject to any disclaimer, the term of this patent is extended or adjusted under 35 U.S.C. 154(b) by 161 days.

(21) Appl. No.: 12/878,345

(22) Filed: Sep. 9, 2010

(65) Prior Publication Data

US 2011/0056136 A1 Mar. 10, 2011

Related U.S. Application Data

(60) Provisional application No. 61/240,673, filed on Sep. 9, 2009.

(51) Int. Cl.
*E06B 7/00* (2006.01)
*H01B 17/58* (2006.01)

(52) U.S. Cl.
USPC .................................. 49/167; 49/381; 49/504

(58) Field of Classification Search
USPC .................................... 49/167, 381, 501, 504
See application file for complete search history.

(56) References Cited

U.S. PATENT DOCUMENTS

| 3,848,361 | A | * | 11/1974 | Foster et al. ..................... 49/167 |
|---|---|---|---|---|
| 4,140,357 | A | * | 2/1979 | Wolz et al. ....................... 439/31 |
| 4,445,299 | A | | 5/1984 | Lehikoinen |
| 5,092,647 | A | * | 3/1992 | Ueda et al. .................. 296/146.9 |
| 5,141,446 | A | * | 8/1992 | Ozouf et al. ................... 439/165 |
| 5,212,907 | A | * | 5/1993 | Van Sandt .......................... 49/70 |
| 5,586,895 | A | * | 12/1996 | Zehrung ........................ 439/165 |
| 5,690,501 | A | | 11/1997 | Mader |
| 5,727,960 | A | * | 3/1998 | Zehrung ........................ 439/165 |
| 6,812,407 | B1 | * | 11/2004 | Opperman .................... 174/100 |
| 7,824,200 | B2 | * | 11/2010 | Bryla et al. .................... 439/165 |
| 2007/0032275 | A1 | * | 2/2007 | Suzuki et al. ............... 455/575.3 |

* cited by examiner

*Primary Examiner* — Katherine Mitchell
*Assistant Examiner* — Justin Rephann
(74) *Attorney, Agent, or Firm* — Woods Oviatt Gilman LLP

(57) ABSTRACT

A device for transferring electrical power between a frame and a closable member such as a door includes a first housing and face plate disposed in an opening in the frame and a second housing and face plate disposed in an opening in the closable member edge. The openings are positioned so that when the closable member is closed the openings are aligned. A hollow elbow assembly is rotatably disposed and secured in each hole. A tube having a pivot guide at each end is rotatably and axially slidable in each elbow assembly. A slot in each elbow assembly allows the tube to pivot. A wire bundle in the tube is connectable to wire leads. Boots may be supplied around the tube/elbow assemblies' junctions to exclude water. Thus, the wire bundle is fully contained within a protective, articulated, armored sheath to prevent wear, chafing, breakage, and vandalism.

13 Claims, 4 Drawing Sheets

APPARATUS FOR TRANSFERRING ELECTRIC POWER BETWEEN A CLOSABLE MEMBER AND A FRAME

REFERENCE TO PRIOR APPLICATIONS

This application claims the benefit of U.S. Provisional Application No. 61/240,673, filed Sep. 9, 2009.

TECHNICAL FIELD

The present invention relates to an apparatus for transferring electric power between a closable member and a frame; more particularly, to such apparatus wherein the electric conductors are entirely shielded to prevent accidental or malicious damage; and most particularly, to such apparatus wherein such shielding improves over the prior art in the degree of security afforded, simplicity of design, and reduced cost of manufacture.

BACKGROUND OF THE INVENTION

In numerous applications of a closable member, such as a door hinged in a frame, for example, in some electric locking mechanisms, it is a requirement to provide passage for electric power between the door and the frame. Fundamentally, this requires a bundle of flexible and extendable wire conductors to bridge across the gap between the door and the frame. Because the gap changes in both length and direction as the door swings on its hinges, a wire bundle is subject to damage by becoming pinched, abraded, or sheared. Further, a wire bundle is easily severed maliciously by persons wishing to defeat the mechanism. Thus, substantial prior art is devoted to systems for providing movable protective shielding between a door and frame to prevent damage to a wire bundle passing therebetween.

All such movable systems are confronted with a common set of geometric requirements.

First, the system must be accommodated within the door and/or frame when the door is closed.

Second, the system must be capable of extension and retraction between the full closed and fully open door positions.

Third, the system must be capable of pivoting between the system ends through an angle equal to the open angle of door in the frame, i.e., if the door is opened 180°, the system must also be capable of rotating 180° within itself from its starting configuration.

Fourth, the ends of the system at door and frame must each be capable of rotational motion in at least two dimensions, i.e., in planes parallel and orthogonal to the planes of the door edge and the frame edge, respectively.

U.S. Pat. No. 4,445,299 discloses an arrangement comprising first and second members mountable to a door and frame. Arranged around an electrical cable is a separate, turnable, and longitudinally flexible protecting element such as a coil spring. This element is arranged basically in the longitudinal direction of the door frame. One end of the spring is connected to the door frame member and the other end to the door. There is in the door frame and/or in door edge part at least one recess so arranged that, when the door is closed, the protecting element and cable are received in this recess.

Although simple in construction, the device has at least two important shortcomings. First, the spring acts as a torsion spring to exert an opening or closing force on the door as the spring ends are counter-rotated, which may not be desirable. Second, when the spring is flexed and extended as the door opens, the spring coils are spread apart, thus allowing easy insertion of a sharp tool as might be desired for malicious severing or shorting of the electrical wiring.

U.S. Pat. No. 5,690,501 discloses an apparatus for providing an electrical connection from a power source, through a stationary door frame, into a door to connect to door-mounted electrically-operated hardware, including an electrical junction box installed in a mortise cavity in the door frame adjacent to a similar electrical junction box installed in a mortise cavity in an edge of the door. The junction boxes are adjacent each other when the door is in a closed position, and a housing is installed in each junction box, each housing having a longitudinal slot in a face plate thereof of a length substantially equal to the length of the junction box. A cover plate is longitudinally slidably engaged in grooved fingers on a rear surface of the face plate, the cover plate having a substantially circular hole. A hollow tube, having an elbow swivelably mounted on each end, has one elbow swivelably engaged in the substantially circular hole of the cover plate of the housing mounted in the door frame and the other elbow swivelably engaged in the substantially circular cover plate of the housing mounted in the door. A conductor cable connected to a power source, in the junction box mounted in the door frame, extends through the elbows and the hollow tube into the junction box mounted in the door, and connects to leads to door hardware mounted in or on the door. In operation, as the door is opened, because the length of the elbows and hollow tube is constant the cover plates are caused to slide toward each other as the tube rotates within the elbows.

This device has at least two shortcomings. First, it requires a relatively large number of components and thus is relatively expensive to manufacture. Second, as the cover plates slide toward one another, the force vector for return of the plates becomes progressively less favorable; thus the plates potentially can become cocked and jammed in their guides, especially as the mechanism becomes worn with extended use.

What is needed in the art is a simple, reliable apparatus for transferring electric power between a door and a frame wherein the number of components is relatively low, the manufacturing cost is relatively low, and the wiring bundle is fully protected at all times.

It is a principal object of the present invention to reduce the cost and complexity of an apparatus for transferring electric power between a door and a frame.

SUMMARY OF THE INVENTION

Briefly described, a device for transferring electrical power between a door frame and a closable member such as a door includes a first housing and face plate disposed in an opening in the door frame and a second housing and face plate disposed in an opening in the door edge for receiving electrical wire leads routed to the two housings, respectively, which may also serve as junction boxes for connecting the device at either end. The openings are positioned so that when the door is closed in the frame the openings are aligned vertically and horizontally. Each face plate has a receiving hole. A hollow elbow assembly is rotatably disposed in each receiving hole. A retaining mechanism rotatably retains each elbow assembly in its respective receiving hole. The retaining mechanism may be, for example, a retaining ring or mating/interlocking keeper features.

Each elbow assembly includes a recess in the forward area of the assembly. Each recess receives an end of a hollow rigid shaft (tube). At each end of the tube is a slidably disposed pivot guide. Each elbow assembly consists of a cover defining the recess and an insertion portion having a tubular end through which at least one electric conductor passes. To form the elbow assembly, the insertion portion is secured to the elbow cover, for example, by screws. Once secured, the elbow assembly captures the pivot guide thereby restraining the tube from removal from the elbow assembly. Since the pivot guide is slidably disposed on the tube, the tube is allowed to axially slide within the pivot guide and in relation to the elbow assembly. The recess of each face plate is configured for receiving the respective elbow assembly and tube when the door is closed. Each elbow assembly has a slot formed in the outer portion thereof to allow the tube end to pivot within the extent of the slot in a plane orthogonal to the plane of rotation of the elbow. Thus, when the door is moved through its prescribed rotation, the rotations of the elbows combine with the sliding and pivoting of the tube ends in relation to the elbow assemblies to allow three degrees of freedom without bending or breaking of the tube or elbow assemblies. A conductive bundle passing through the tube is connectable to the wire leads. Elastomeric boots may be supplied around the junctions of the tube with the elbow assemblies to exclude water.

Thus, the conductive bundle is fully contained within a protective armored sheath to prevent wear, chafing, and breakage due to relative movement of the wires, tube, or elbows, and also is further protected against vandalism.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
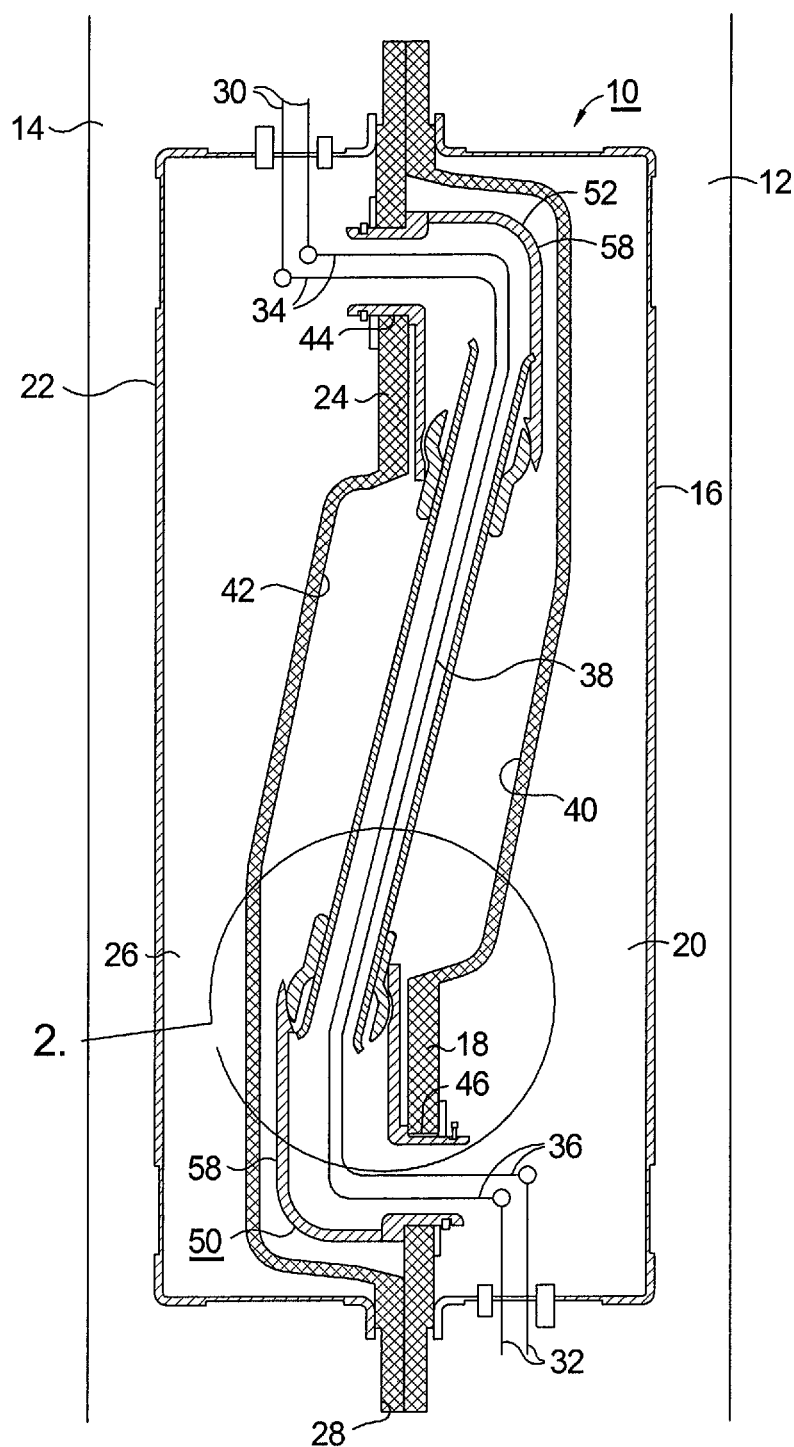
FIG. 1 is an elevational cross-sectional view of a device in accordance with the present invention for transferring electrical power between a door frame and a door.

Referring to FIGS. 1 through 5, a device 10, for transferring electrical power between a door frame 12 and a closable member such as, for example, a door 14, comprises a first housing 16 and face plate 18 disposed in an opening 20 in frame 12 and a second housing 22 and face plate 24 disposed in an opening 26 in the edge 28 of door 14 for receiving electrical wire leads 30,32 (FIG. 1 only) routed to the two housings 16,22, respectively, which housings also serve as junction boxes for connecting leads 34,36 of wire bundle 38 at either end. Openings 20,26 are positioned so that when door 14 is closed in frame 12 the openings are aligned vertically and horizontally. Each face plate 18,24 includes an oblong recess 40,42 and a hole 44,46 for receiving an elbow assembly 50,52.

Figure 3:
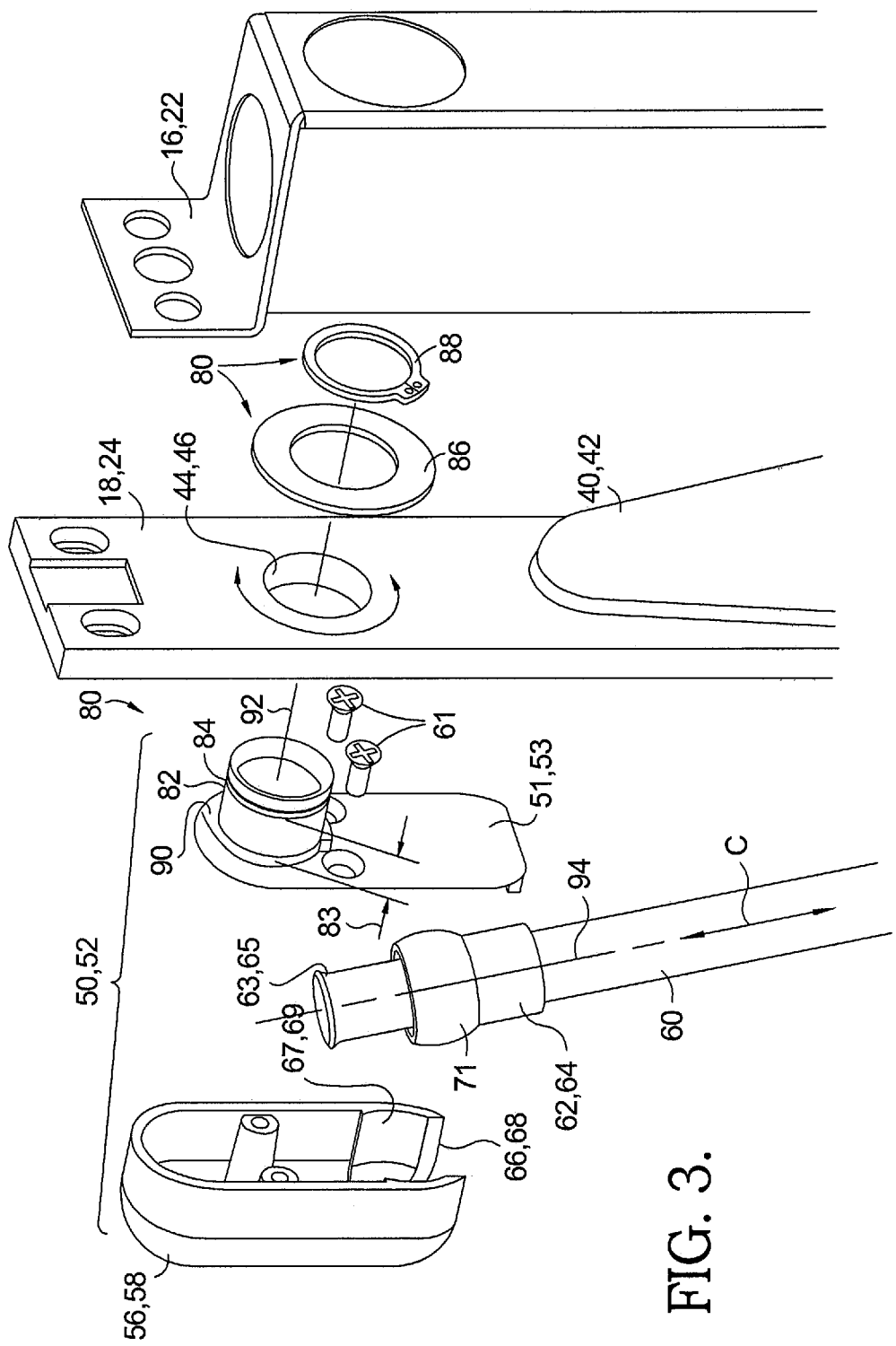
FIG. 3 is an exploded isometric view showing assembly of a representative end of a tube, an elbow assembly and a housing face plate in accordance with the present invention.
Figure 5:
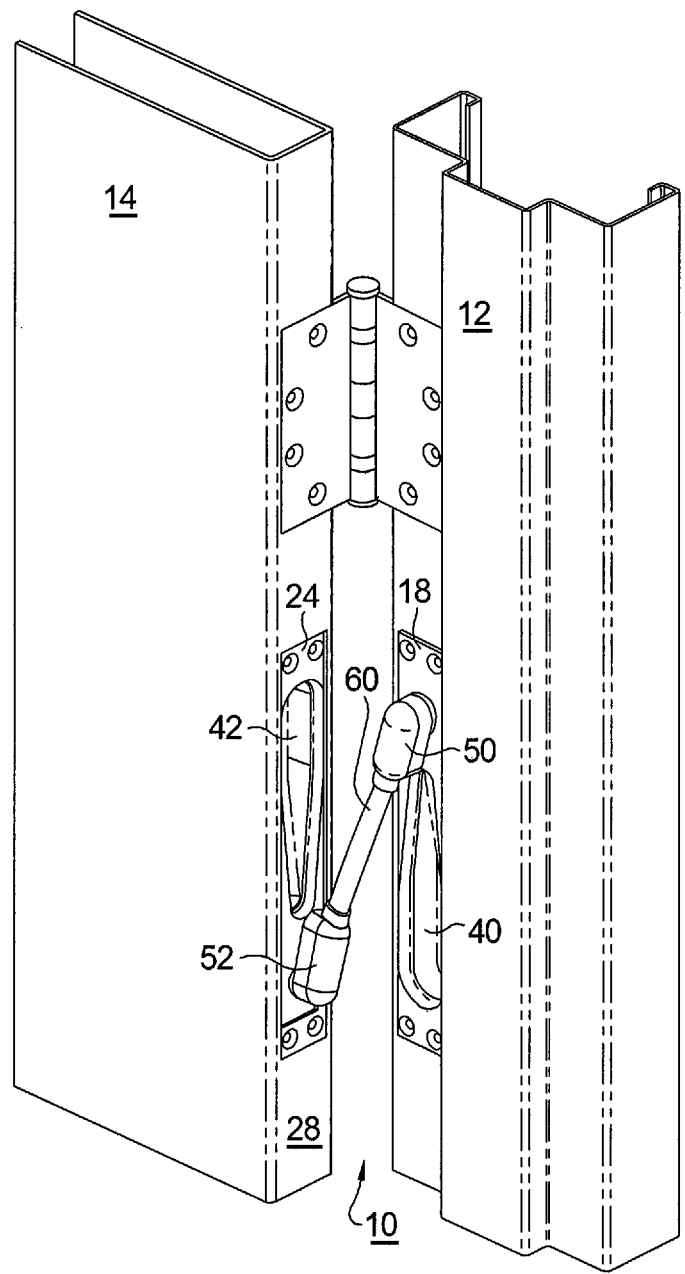
FIG. 5 is an isometric view showing a door hinged to a frame and an installed device in accordance with the present invention, with the door open 90°.

Referring to FIG. 3, elbow assembly 50,52, including insertion portion 51,53 and elbow cover 56,58, is rotatably disposed in each receiving hole 44,46 of a respective face plate 18,24. Rigid tube 60, having a axially slidable pivot guide 62,64 and formed flare 63,65 to retain the respective axially slidable pivot guide at each end, is disposed in each of elbow assemblies 50,52. Each elbow cover 56,58 has a slot 66,68 formed in the outer portion thereof to allow tube 60 to pivot within the extent of slot 66,68 in respective planes orthogonal to the planes of rotation of elbow assemblies 50,52 in face plates 18,24. Each elbow cover 56,58 also includes a socket feature 67,69 loosely conforming to the shape of knob end 71 of pivot guide 62,64. After alignment of tube 60 adjacent insertion portion 51,53, covers 56,58 are permanently secured to insertion portions 51,53, for example, by screws 61. When secured to its respective portions 51,53, socket feature 67,69 loosely envelops knob end 71 and retains tube 60 from passing longitudinally out through slots 66,68 during the mechanism's use.

Still referring to FIG. 3, mechanism 80 for rotatably securing elbow assemblies 50,52 to their respective face plates 18,24 is shown. Mechanism 80 includes tubular end 82 of insertion portion 51,53, annular snap ring groove 84, thrust washer 86 and snap ring 88. During assembly of device 10 shown in FIG. 3, tubular end 82 is inserted into its respective face plate 18,24, after assembly. Thrust washer 86 is then placed over tubular end 82 and snap ring 88 is seated into groove 84. The axial length 83 of tubular end 82, between face 90 and groove 84, and the diameter of tubular end 82 with respect to the diameter of receiving hole 44,46 are configured to permit rotatable movement between elbow assembly 50,52 and its respective face plate 18,24.

Figure 4:
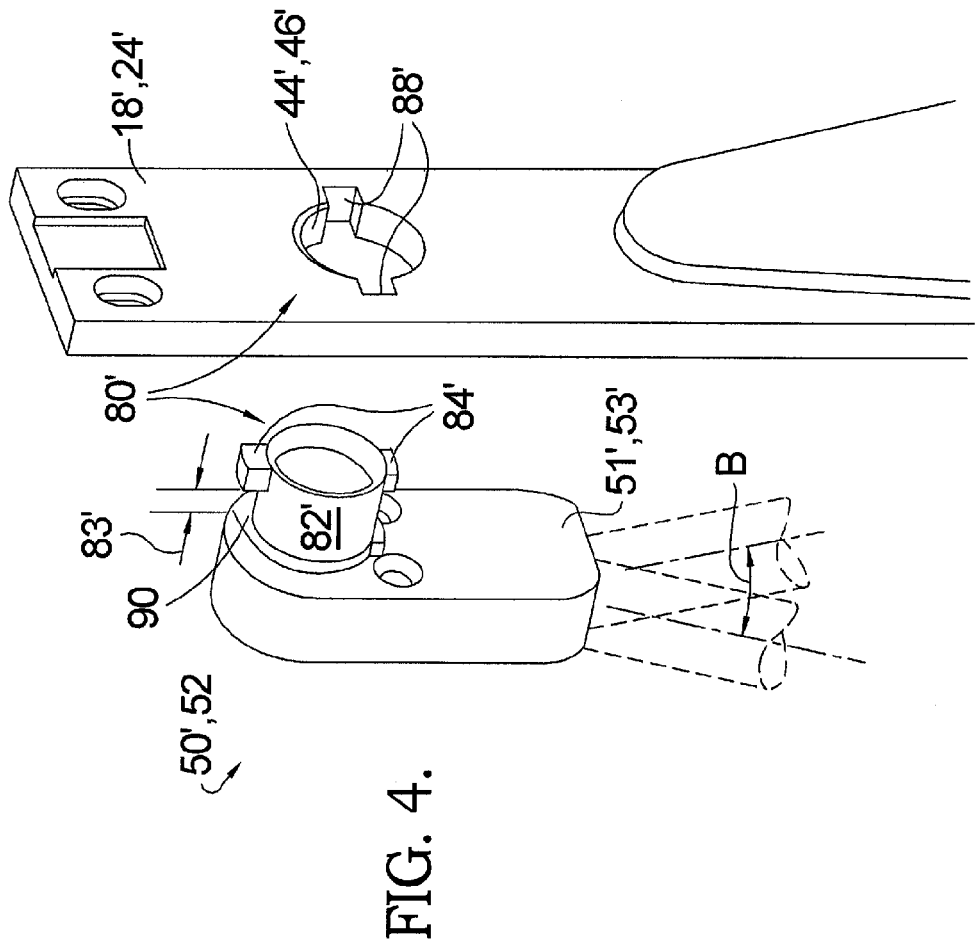
FIG. 4 is an exploded isometric view of a variation of the embodiment shown in FIG. 3 in which the elbow assembly may be rotatably secured to the face plate in accordance with the present invention.
Figure 2:
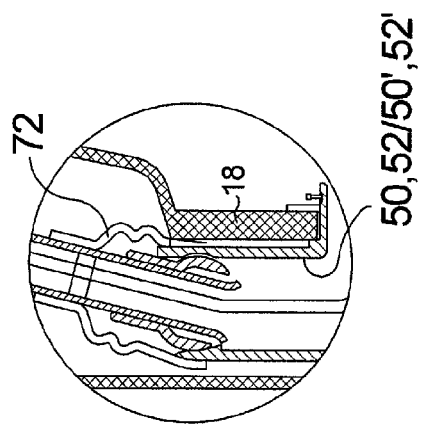
FIG. 2 is a close-up view of the section marked "2" in FIG. 1 showing an elastomeric boot applied to the embodiment, in accordance with the present invention.

Referring now to FIG. 4, an alternate mechanism 80' for rotatably securing elbow assembly 50',52' to its respective face plate 18',24' is shown. Mechanism 80' includes tubular end 82' of insertion portion 51',53', first keeper feature 84' of tubular end 82' and second keeper feature 88' formed in face plate 18'24'. During assembly of device 10', tubular ends 82' is inserted into its respective face plate 18',24' in a radial position that is outside the operating rotation limits while installed so that first and second keeper features 84',88' align. Once inserted, elbow assembly 50',52' is then rotated into operating position so that first and second keeper features 84',88' no longer align. The axial length 83' of tubular end 82', between face 90 and first keeper feature 84, and the diameter of tubular end 82' with respect to the diameter of receiving hole 44',46' are configured to permit rotatable movement between elbow assembly 50',52' and its respective face plate 18',24'. After assembly, such an arrangement allows rotation, but not extraction, of elbow assemblies 50',52' in receiving holes 44',46' during use.

In the embodiments described, when door 14 is moved through its prescribed rotation in frame 12, the rotations of the elbow assemblies within their respective receiving holes combine with the axial sliding and pivoting of the tube in relation to the elbow assemblies to allow three degrees of freedom without bending or breaking of the shaft or elbows. The three degrees of freedom are: rotatably (A) about axis 92 (FIG. 3), pivotally (B) in a plane orthogonal to the plane of rotation of the elbow assemblies (FIG. 4) and slidably (C) along the longitudinal axis 94 of tube 60 (FIG. 3).

Wire bundle 38 passing through tube 60 and elbow assemblies 50,52 and 50',52' is connectable to the wire leads 30,32 within housings 16,22. Connecting leads 34,36 making up wire bundle 38 are formed slightly longer than necessary to span between wire leads 30,32 so that, as door 14 moves through its rotation, and tube 60 slides axially through one or both slots 66,68 of elbow assemblies 50,52, and 50',52' thereby bridging the increased distance between the elbow assemblies, the excess slack of the connecting leads will be taken up within tube 60.

For outdoor applications, elastomeric boots 72 (FIG. 2) may be supplied around the junctions of tube 60 with the elbow assemblies 50,52 and 50',52' to exclude water.

Thus, wire bundle 38 is fully contained within a protective armored sheath to prevent wear, chafing, and breakage due to relative movement of the wires, tube, or elbows, and so is further protected against vandalism. The present device 10,10' may be comprised only of non-flexible components which may be formed of any durable material to any desired thickness. The present device also functions without recourse to sliding plates or springs of any kind as in the prior art.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An apparatus for transferring electric power between a closable member and a frame when said closable member is moved between an open position and a closed position, said apparatus comprising:
    a) a first housing and first face plate for connecting to said frame, wherein said first face plate includes a first hole, and wherein said first face plate is fixed in place relative to said first housing;
    b) a second housing and second face plate for connecting to said closable member, wherein said second face plate includes a second hole, and wherein said second face plate is fixed in place relative to said housing;
    c) a first elbow assembly rotatably disposed in said first hole;
    d) a second elbow assembly rotatably disposed in said second hole; and
    e) a tube having a longitudinal axis and opposite first and second ends, wherein said first end of said tube is slidably receivable by said first elbow assembly along said longitudinal axis, and wherein said second end of said tube is slidably receivable by said second elbow assembly along said longitudinal axis, enabling relative movement between said tube assembly and said first and second elbow assemblies when said closable member is moved between said open position and said closed position.

2. An apparatus in accordance with claim 1 wherein each of said first and second elbow assemblies comprises an insertion portion and an elbow cover, wherein said insertion portions are inserted into said respective first and second holes and said covers are attached to said insertion portions and configured to capture said tube ends.

3. An apparatus in accordance with claim 2 wherein at least one of said tube ends includes a slidable first pivot guide configured for being captured by at least one of said elbow assemblies.

4. An apparatus in accordance with claim 1 further comprising a mechanism for rotatably securing at least one of said first or second elbow assemblies to one of said first or second face plates.

5. An apparatus in accordance with claim 4 wherein at least one of said first or second holes is provided with at least one first keeper feature, and wherein at least one of said first or second elbow assemblies is provided with at least one second keeper feature matable with said at least one first keeper feature and receivable by said at least one first keeper feature during insertion of said respective elbow assembly into said respective hole.

6. An apparatus in accordance with claim 5 wherein said at least one first keeper feature and said at least one second keeper feature are misaligned during operation of said apparatus.

7. An apparatus in accordance with claim 4 wherein each of said first and second holes is provided with at least one first keeper feature, and wherein each of said first and second elbow assemblies is provided with at least one second keeper feature matable with said at least one first keeper feature and receivable by said at least one first keeper feature during insertion of said respective elbow assembly into said respective hole.

8. An apparatus in accordance with claim 7 wherein said at least one first keeper feature and said at least one second keeper feature are misaligned during operation of said apparatus.

9. An apparatus in accordance with claim 4 wherein said mechanism includes an annular groove disposed on said at least one of said first or second elbow assemblies and wherein a retaining ring is received by said groove after insertion of said at least one of said first or second elbow assemblies into one of said first or second holes.

10. An apparatus in accordance with claim 1 wherein each of said first and second elbow assembly includes a slot configured to permit pivotable movement of said tube with respect to each of said in first and second elbow assembly.

11. An apparatus in accordance with claim 1 wherein said first and second housings are provided with openings to permit access of electrical leads in said respective frame and door to the interior of said first and second housings.

12. An apparatus in accordance with claim 1 further comprising at least one elastomeric boot disposed over a junction between said tube and at least one of said elbow assemblies.

13. A door assembly comprising:
    a) a frame;
    b) a door pivotably disposed on said frame; and
    c) an apparatus for transferring electric power between said door and said frame when said door is moved between an open position and a closed position, said apparatus comprising:
    d) a first housing and first face plate for connecting to said frame, wherein said first face plate includes a first hole, and wherein said first face plate is fixed in place relative to said first housing;
    e) a second housing and second face plate for connecting to said door, wherein said second face plate includes a second hole, and
    wherein said second face plate is fixed in place relative to said housing;
    f) a first elbow assembly rotatably disposed in said first hole;
    g) a second elbow assembly rotatably disposed in said second hole; and
    h) a tube having a longitudinal axis and opposite first and second ends, wherein said first end of said tube is slidably receivable by said first elbow assembly along said longitudinal axis, and wherein said second end of said tube is slidably receivable by said second elbow assembly along said longitudinal axis, enabling relative movement between said tube assembly and said first and second elbow assemblies when said door is moved between said open position and said closed position.

\* \* \* \* \*